United States Patent [19]

Zellhoefer

[11] 4,156,055
[45] May 22, 1979

[54] ANODE FOR THERMAL CELL

[75] Inventor: Glenn F. Zellhoefer, Normal, Ill.

[73] Assignee: National Union Electric Corporation, Stamford, Conn.

[21] Appl. No.: 114,050

[22] Filed: Jun. 1, 1961

[51] Int. Cl.² ............................................. H01M 6/30
[52] U.S. Cl. .................................................... 429/112
[58] Field of Search .................. 136/83, 83.1, 90, 90.5, 136/120, 125; 429/112

[56] References Cited

U.S. PATENT DOCUMENTS

| | | | |
|---|---|---|---|
| 856,162 | 6/1907 | Kitsee | 73/359 R |
| 2,081,926 | 6/1937 | Gyuris | 429/102 |
| 2,102,701 | 12/1937 | Gyuris | 429/29 |
| 2,999,122 | 9/1961 | Zauner | 429/112 |

OTHER PUBLICATIONS

Goodrich et al., "J. of Electro Chem. Society," vol. 99, No. 8, pp. 2076, 2080 (Aug. 1952).
McKee et al., "Tenth Annual Battery Research Conference," pp. 26–28, May 24, 1956.

Primary Examiner—Leland A. Sebastian
Attorney, Agent, or Firm—Merriam, Marshall & Bicknell

EXEMPLARY CLAIM

7. In a thermal cell including a mass of electrolyte, a depolarizing agent, a cathode, and an anode; the improvement wherein said anode comprises a pelletized mixture of an anode metal and a refractory non-flow agent, said anode metal having a fushion point within the optimum operating temperature range of the cell and being selected from the group consisting of magnesium-aluminum alloys, mixtures of magnesium and aluminum powders, calcium-magnesium alloys, mixtures of calcium and magnesium powders, and zinc, and said non-flow agent being selected from the group consisting of zirconium oxide and alumina.

18 Claims, 3 Drawing Figures

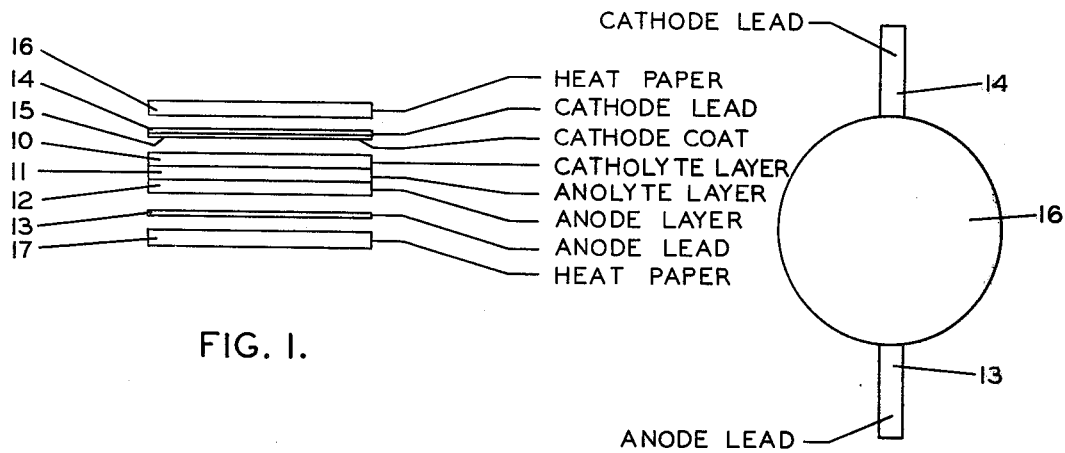
FIG. 1.
FIG. 2.
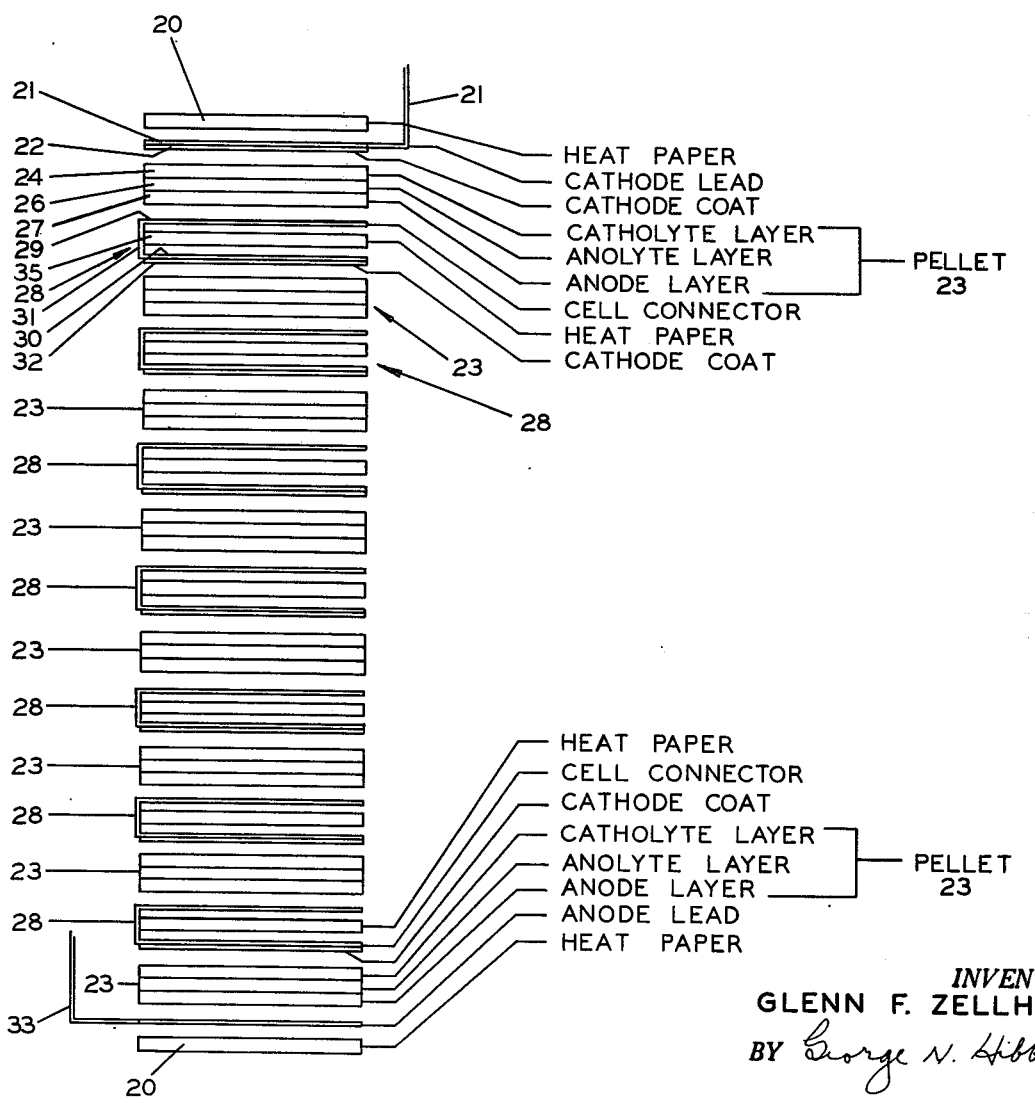
FIG. 3.
INVENTOR.
GLENN F. ZELLHOEFER
BY George N. Hibben

ANODE FOR THERMAL CELL

This invention relates to improvements in thermal cells and more particularly to a novel and improved anode for the same.

Thermal cells may be defined as electrochemical power supplies based upon electrolytes of various inorganic salts which remain solid and non-conductive at all storage temperature. When the cell is heated to some elevated temperature the electrolyte melts and becomes conductive and electrical energy may be withdrawn from the system.

For a given electrochemical system and for a given load cycle, a thermal cell has a particular optimum range of operating temperature. However, this optimum temperature range is ordinarily narrower than the ambient temperature range over which the cell is required to operate. Consequently, as a practical matter, the heat input during activation of the cell is usually adjusted to give essentially the same useful cell life under a given load cycle for activation of the cell at either the minimum or the maximum ambient temperature. As a result, the power output realized when the cell is activated at either extreme of the ambient temperature range is substantially less than could be realized if the cell were activated within its optimum operating temperature range.

For example, in my copending application, Ser. No. 536,685, filed Sept. 23, 1955, now U.S. Pat. No. 3,954,503, a thermal cell is described which utilizes magnesium as the anode in the electrochemical system $M/KCl-LiCl-kaolin/KCl-LiCl-V_2O_5/V_2O_5-B_2O_3/Ni$ wherein M comprises an anode metal. When batteries with cells of this type are designed to operate across a wide range of ambient temperatures, usually $-54°$ C. to $74°$ C., their useful life is limited. This limitation is due, in part, to the fact that the heat input required to bring a cell from $-54°$ C. to the minimum temperature necessary for satisfactory activation under load is substantially in excess of that required to bring the cell from $74°$ C. to the maximum temperature at which it is capable of developing its full power. This necessitates a heat input to the cells that is less than optimum when the battery is activated at $-54°$ C. and more than optimum when activated at $74°$ C.

Another problem encountered in thermal cells is the danger of severe thermal shock or even destruction of the cell when exposed to intense heat during activation, as by high temperature combustion of heat paper or other pyrotechnic material.

Accordingly, one object of the present invention is to provide novel means for improving the useful life of a thermal cell designed for activation over a wide ambient temperature range.

Another object of the invention is to provide novel means for limiting the peak temperature attained by a thermal cell when activated over a wide ambient temperature range.

A further object of the invention is to provide novel temperature regulating means in a thermal cell such that a given heat input may bring the cell from $-54°$ C. to the minimum temperature required for satisfactory activation under load or may bring it from $74°$ C. to a temperature less than the maximum temperature at which it is capable of developing its full power.

An additional object of the invention is to provide a novel thermal buffer for a thermal cell to prevent or minimize thermal shock to the cell from intense heat supplied to the cell during activation.

Still another object of the invention is to provide a novel and improved anode for a thermal cell.

Other objects and advantages of the invention will become evident from the subsequent detailed description taken in conjunction with the accompanying drawing, wherein:

FIG. 1 is a diagrammatic side elevational view of a thermal cell embodying the features of the present invention, the elements of the cell being shown in spaced relation for clarity;

FIG. 2 is a top plan view of the cell shown in FIG. 1; and

FIG. 3 is a diagrammatic side elevational view of a thermal battery comprising an arrangement of eight thermal cells of the type shown in FIGS. 1 and 2.

Broadly speaking, the objects of the present invention are achieved by utilizing in a thermal cell an anode comprising a pelletized mixture of a metal powder and a non-flow agent powder in which the anode metal has a fusion temperature slightly less than the maximum of the cell's optimum operating temperature range and the non-flow agent powder has capability of immobilizing the molten anode metal without entering into chemical reaction detrimental to the operation of the cell.

For convenience and by way of illustration only, the invention will be described hereinafter with particular reference to a pelletized or pressed powder type thermal cell having the electrochemical system $M/KCl-LiCl-kaolin/KCl-LiCl-V_2O_5/V_2O_5-B_2O_3/Ni$, as described in my aforementioned copending application. However, it should be understood that the immobilized fusible anode principle of the present invention may also be employed in thermal cells having other electrochemical systems.

The behavior of the cell and the function of the immobilized fusible anode is better understood in the light of the following characteristics of the $M/KCl-LiCl-kaolin/KCl-LiCl-V_2O_5/V_2O_5-B_2O_3/Ni$ electrochemical system. Under ordinary load cycles the minimum activation temperature of the cells are $390°$ to $415°$ C. and after activation they can carry their load at temperatures as low as $352°-365°$ C. The lower the current density the lower the permissible activation temperature within the range of $390°-415°$ C., and the lower the activation temperature the lower the minimum operating temperature within the range of $352°-365°$ C. The maximum operating temperature at which the cells can develop their full power under an ordinary load cycle are $445°$ to $460°$ C., and after activation at these temperatures they can carry their load at temperatures as low as $410°-425°$ C. The lower the current density the lower the optimum activation temperature within the range of $445°$ to $460°$ C., and the lower the activation temperature the lower the minimum operating temperature within the range of $410°-425°$ C.

In accordance with the principle of the present invention, the anode metal of the immobilized fusible anode is so chosen and the cell is so designed that when activated at the higher ambient temperatures with a given heat input, the anode metal fuses, absorbs latent heat of fusion, and retains this latent heat until radiation losses cause the metal to freeze, but when the cell is activated at low ambient temperatures with the same heat input the anode metal may fuse momentarily but if it does it quickly freezes and releases its latent heat. Thus, when the cell is activated at the higher ambient temperatures, such as 74° C., the heat absorbed and retained by fusion of the anode metal prevents overheating of the cell, but when the cell is activated at the lower ambient temperatures, such as −54° C., no latent heat is retained by the metal to reduce the cell's activation temperature.

As will hereinafter appear, a thermal cell of the type here involved includes a heat source disposed in close physical proximity to the cell and capable of releasing intense heat for melting the electrolyte and thereby activating the cell. The immobilized fusible anode of the present invention, in addition to regulating the peak temperature attained by the cell as described above, also serves to prevent or minimize thermal shock to the cell during the activation period. The elimination or minimizing of thermal shock improves the cell performance at all operating temperatures of the cell.

The immobilized fusible anode comprises a pelletized or compressed mixture of a suitable anode metal powder and a refractory non-flow agent powder capable of immobilizing the anode metal when the latter is in molten condition. For the specific electrochemical system described above, the anode metal may have a fusion temperature of from about 415° C. to about 460° C., preferably from about 435° C. to about 445° C. Fusible anode metals which have been found to be particularly useful include certain magnesium-aluminum alloys, certain calcium-magnesium alloys, and zinc. The non-flow or immobilizing agents which have been found to be most suitable include zirconium oxide and alumina. In some cases, it may also be desirable to include in the anode, in addition to the anode metal and the non-flow agent, a minor amount of a fusible salt electrolyte which is electrically conductive when molten for the purpose of insuring effective electrical contact between the fused particles of anode metal and the anolyte. For example, from about 8 to about 16 wt. % of a eutectic mixture of KCl-LiCl may be used for this purpose.

Referring more particularly to FIGS. 1 and 2 of the drawings, there is illustrated a preferred design of a thermal cell embodying the present invention. This thermal cell comprises a three layer pellet consisting of a catholyte layer 10, an anolyte layer 11, and an anode layer 12. In this preferred embodiment, the catholyte layer 10 comprises a pressed powder mixture of approximately three parts by weight of a eutectic mixture of KCl and LiCl and five parts by weight of $V_2O_5$. The anolyte layer 11 is a pressed powder mixture of approximately 38 wt. % kaolin and 62 wt. % of the eutectic mixture of KCl and LiCl. The anode layer 12 is a pressed powder comprising the fusible anode metal and the non-flow agent.

As shown in FIG. 1, a nickel disk and lead 13 is disposed below the anode layer 12 for contact therewith. Above the catholyte layer 10 there is a nickel disk and lead 14, and on the under surface of this disk is a cathode coat 15 adapted to be placed in intimate contact with the upper surface of the catholyte layer 10. The cathode coat 15 may comprise a fused mixture of approximately 78 wt. % $V_2O_5$ and 22 wt. % $B_2O_3$.

As also shown in FIG. 1, a layer of heat paper 16 is positioned on top of the nickel disk 14 and a layer of heat paper 17 is positioned below the nickel disk 13. By way of example, the heat paper layers 16 and 17 may comprise a stoichiometric mixture of zirconium powder and barium chromate intimately mixed with and supported on a suitable fibrous carrier of heat resistant material such as asbestos or the like. Although some of the layers and elements comprising the thermal cell above described are illustrated in FIG. 1 in separated or spaced relation, it is to be understood that such spacing is for the purpose of clarity and that in practice the various layers and parts are stacked in intimate engagement one on top of the other.

In FIG. 3 of the drawing there is shown a thermal battery arrangement comprising eight cells of the same type and character as illustrated in FIGS. 1 and 2 and described above, although it is to be understood that the number and arrangement of the cells may be varied depending upon the ultimate use of the thermal battery. Because a plurality of cells are utilized in this form of battery, cell connectors 28 are utilized to electrically connect one cell of the stack with its adjacent cells. The uppermost cell of the stack shown in FIG. 3 comprises a layer of heat paper 20 and a disk and lead 21 having a cathode coat 22 similar to the coat 15 described in connection with FIG. 1. Below the cathode coat 22 is a pellet 23 composed of the catholyte layer 24, the anolyte layer 26, and the anode layer 27, each of said layers being of compositions similar to those of layers 10, 11 and 12, respectively, as described above with respect to the single cell of FIG. 1. Below the pellet 23 is a cell connector 28 comprising a disk 29, a spaced disk 30 and an integral joint 31 conductively connecting said disks. Between the disks of the cell connector 28 there is a further layer of heat paper 35 similar to the heat paper 20 and serving the same purpose. The disk 30 of the connector has a cathode coat 32 on its underside and below the cathode coat 32 is another pellet 23.

This alternating arrangement of electrolyte pellet 23 and cell connectors 28 is repeated in the stack to form the remainder of the eight cell battery except that at the bottom of the stack below the bottom pellet 23 there is an anode lead 33 which, together with the cathode lead 21 at the top of the stack, constitute the external leads of the battery. It is to be understood that although the pellets, cell connectors, anode and cathode leads, and heat paper layers are shown to be in spaced relation, such spacing is for clarification only and on actual assembly the various component layers are pressed down into intimate engagement.

The preferred anode metal for use in the immobilized fusible anode 12 (of FIG. 1) or 27 (of FIG. 3) is a magnesium-aluminum alloy containing about 68 wt. % magnesium and about 32 wt. % aluminum and having a fusion temperature of about 437° C. Fifty-five parts of this alloy powder with a particle size of 80–140 mesh and 45 parts of zirconium oxide of like particle size may be pelletized to form an immobilized fusible anode. Pellet type cells employing this anode in the M/KCl-LiCl-kaolin/KCl-LiCl-$V_2O_5$/$V_2O_5$-$B_2O_3$/Ni electrochemical system have essentially the same electrochemical properties as comparable cells employing magnesium as the anode if the cells are discharged at a constant operating temperature. However, if the cells are activated by heat paper, the cells with the fusible anode have heat capacity characteristics that provide improved performance and when activated through a wide range of ambient temperatures they have substantially improved performance at the extremes of the ambient temperature range.

Various other alloys of magnesium and aluminum may also be used having a magnesium content of from about 50 wt. % to about 68 wt. %, the balance being aluminum, and having fusion temperatures in the range of from about 437° C. to about 462° C. Instead of zirconium oxide as the non-flow agent, good results are also obtained using alumina with the magnesium-aluminum alloys.

Instead of a preformed magnesium-aluminum alloy, the anode metal may comprise a mixture of magnesium and aluminum powders in the proper proportions. When the cell is activated it appears that the metal powders fuse to form the desired magnesium-aluminum alloy.

Another example of a suitable composition for the immobilized fusible anode 12 or 27 of FIG. 1 or 3 is a pelletized mixture of about 95 wt. % zinc dust as the anode metal and about 5 wt. % laminar alumina with a particle size less than 200 mesh as the non-flow agent. Zinc has a fusion point of about 420° C. and functions effectively for the purposes already described. For example, the electrochemical system $Zn/KCl-LiCl-kaolin/KCl-LiCl-V_2O_5/V_2O_5-B_2O_3/Ni$ has a no load voltage of 1.7–1.8 volts with excellent voltage regulation under load. The no load voltage of 1.7–1.8 for this system compares to 2.8–2.9 for a like system using magnesium as the anode metal.

Still another example of an anode metal which is useful for purposes of the present invention is a calcium-magnesium alloy containing about 78 wt. % calcium and about 22 wt. % magnesium with a fusion temperature of about 445° C. When an immobilized fusible anode containing this alloy and zirconium oxide is used in the aforementioned electrochemical system a no load voltage of 3.2–3.3 volts is obtained. As in the case of the compressed magnesium-aluminum anode metal, a mixture of calcium and magnesium pressed powders in proper proportions may be used instead of a prefused alloy.

By utilizing an immobilized fusible anode as herein described, the useful life of thermal cells is increased when discharged across a wide range of ambient temperatures by reason of the peak temperature regulating effect and the prevention or minimizing of thermal shock. However, even further improvements in the useful life of the cells may be realized by using, in addition to the immobilized fusible anode, a fusible metal heat sink which helps to offset radiation losses. Reference is made to my copending application Ser. No. 114,052, filed June 1, 1961, for a complete disclosure of the fusible metal heat sink principle. By the use of cells having immobilized fusible anodes in combination with suitably arranged fusible metal heat sinks, it is possible to provide a thermal battery having an unusually long useful life.

Although the invention has been described with reference to certain specific embodiments, it is to be understood that various modifications and equivalents may be resorted to without departing from the scope of the invention as defined in the appended claims.

I claim:

1. In a thermal cell having the electrochemical system $M/KCl-LiCl-kaolin/KCl-LiCl-V_2O_5/V_2O_5-B_2O_3/Ni$, wherein M comprises an anode metal, the improvement comprising an anode comprising a compressed mixture of particles of a fusible anode metal and a refractory non-flow agent, said anode metal being selected from the group consisting of a magnesium-aluminum alloy containing about 68 wt. % magnesium and about 32 wt. % aluminum, zinc, and a calcium-magnesium alloy containing about 78 wt. % calcium and about 22 wt. % magnesium, and said non-flow agent being selected from the group consisting of zirconium oxide and alumina.

2. A thermal cell according to claim 1 further characterized in that said anode also includes a minor amount of a fusible salt electrolyte.

3. A thermal cell according to claim 1 further characterized in that said anode also includes a minor amount of a eutectic mixture of KCl and LiCl.

4. A thermal cell according to claim 1 wherein said anode metal comprises said magnesium-aluminum alloy and said non-flow agent comprises zirconium oxide.

5. A thermal cell according to claim 1 wherein said anode metal comprises zinc and said non-flow agent comprises alumina.

6. A thermal cell according to claim 1 wherein said anode metal comprises said calcium-magnesium alloy and said non-flow agent comprises zirconium oxide.

7. In a thermal cell including a mass of electrolyte, a depolarizing agent, a cathode, and an anode; the improvement wherein said anode comprises a pelletized mixture of an anode metal and a refractory non-flow agent, said anode metal having a fusion point within the optimum operating temperature range of the cell and being selected from the group consisting of magnesium-aluminum alloys, mixtures of magnesium and aluminum powders, calcium-magnesium alloys, mixtures of calcium and magnesium powders, and zinc, and said non-flow agent being selected from the group consisting of zirconium oxide and alumina.

8. A thermal cell according to claim 7 further characterized in that said anode metal has a fusion temperature of from about 415° C. to about 460° C.

9. A thermal cell according to claim 7 further characterized in that said anode metal has a fusion temperature of from about 435° C. to about 445° C.

10. A thermal cell according to claim 7 wherein said anode metal comprises a magnesium-aluminum alloy containing from about 50 wt. % to about 68 wt. % magnesium.

11. A thermal cell according to claim 7 wherein said anode metal comprises an alloy containing about 68 wt. % magnesium and about 32 wt. % aluminum.

12. A thermal cell according to claim 7 wherein said anode metal comprises a mixture of magnesium and aluminum powders so proportioned as to yield upon fusion an alloy containing about 68 wt. % magnesium and about 32 wt. % aluminum.

13. A thermal cell according to claim 7 wherein said non-flow agent comprises zirconium oxide.

14. A thermal cell according to claim 7 wherein said non-flow agent comprises alumina.

15. A thermal cell according to claim 7 wherein said anode metal comprises zinc.

16. A thermal cell according to claim 7 wherein said anode metal comprises an alloy containing about 78 wt. % calcium and about 22 wt. % magnesium.

17. A thermal cell according to claim 7 further characterized in that said anode also includes a minor amount of a eutectic mixture of KCl-LiCl.

18. In a thermal cell having the electrochemical system $M/KCl-LiCl-kaolin/KCl-LiCl-V_2O_5/V_2O_5-B_2O_3/Ni$, wherein M comprises an anode metal; the improvement wherein M comprises a pelletized mixture of an anode metal and a refractory non-flow agent, said anode metal having a fusion point within the optimum operating temperature range of the cell and being selected from the group consisting of magnesium-aluminum alloys, mixtures of magnesium and aluminum powders, calcium-magnesium alloys, mixtures of calcium and magnesium powders, and zinc, and said non-flow agent being selected from the group consisting of zirconium oxide and alumina.

* * * * *